C. H. OSMAN.
VEHICLE SIGNAL.
APPLICATION FILED JULY 16, 1920.
1,379,475.
Patented May 24, 1921.
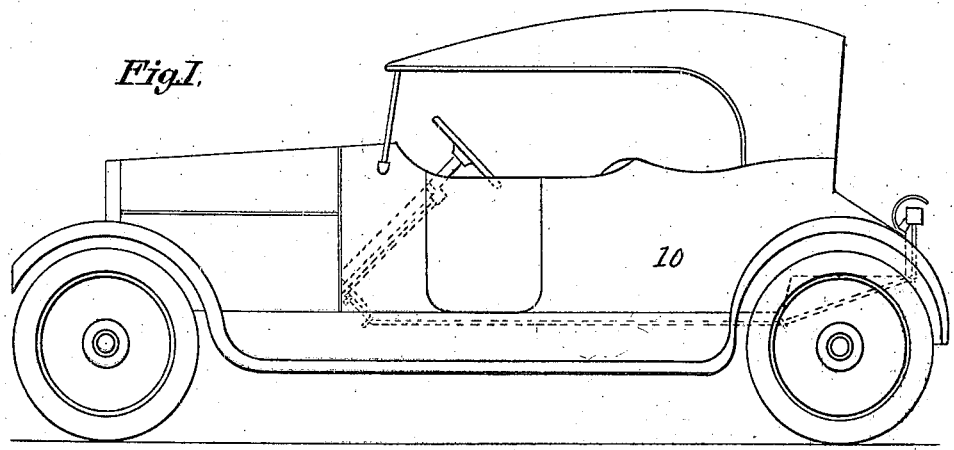
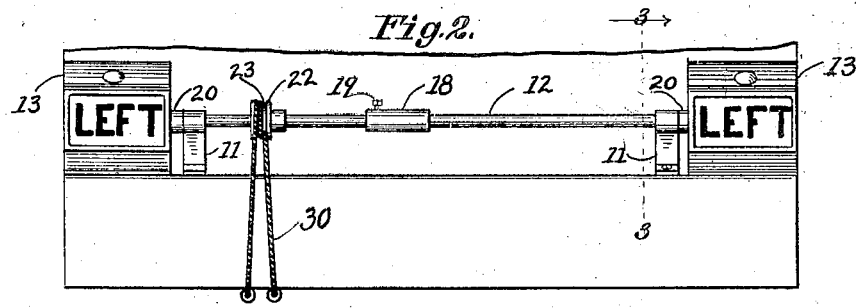
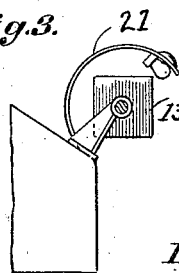 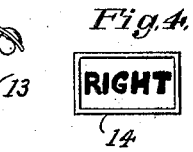 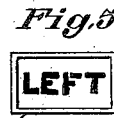 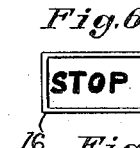 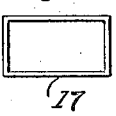
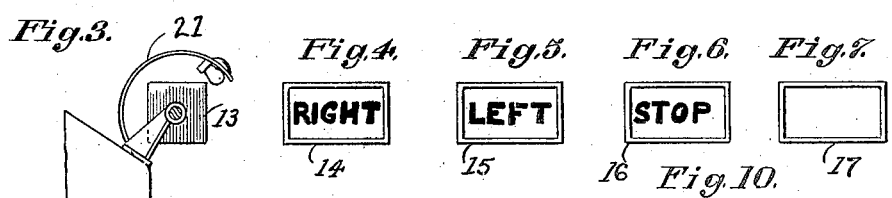
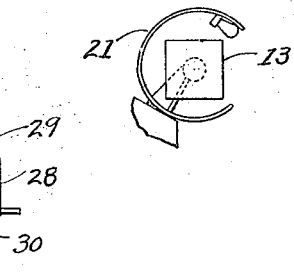
Inventor,
Charles H. Osman.
By Victor J. Evans
Attorney

UNITED STATES PATENT OFFICE.

CHARLES H. OSMAN, OF SAN FRANCISCO, CALIFORNIA.

VEHICLE-SIGNAL.

1,379,475.

Specification of Letters Patent. Patented May 24, 1921.

Application filed July 16, 1920. Serial No. 396,725.

*To all whom it may concern:*

Be it known that I, CHARLES H. OSMAN, a citizen of the United States, residing at San Francisco, in the county of San Francisco and State of California, have invented new and useful Improvements in Vehicle-Signals, of which the following is a specification.

This invention relates to an improvement in vehicle signals operable in response to movement of mechanism disposed on the steering post of the vehicle and more preferably of a motor driven vehicle.

One object of this invention is to provide a vehicle signal which in response to the operation of the mechanism disposed on the steering post assumes various positions of display.

Another object of this invention is to provide a device of the class above described which is adapted to be carried on a suitable support at the rear of an automobile for the purpose of advising the driver of a car behind of an intention to deviate from a straight course, and the invention further provides means to signal both the intention to stop or to resume a straight-ahead course.

A further object of this invention is to provide a device of the above mentioned character, which is adapted to be installed upon or applied to a vehicle without materially altering the construction thereof.

A still further object of this invention is to provide a device of the above mentioned character, which is simple in construction, inexpensive to manufacture, strong, durable and reliable in operation.

Other objects and advantages of the invention will be apparent during the course of the following description.

In the accompanying drawings forming a part of this specification and in which like numerals are employed to designate like parts throughout the same, Figure 1 is a side view of an automobile with my vehicle signal secured thereto.

Fig. 2 is an enlarged front elevation of the signal attached to the rear of an automobile, Fig. 3 is a sectional view taken on the line 3—3 of Fig. 2, looking in the direction of the arrow, Fig. 4, Fig. 5, Fig. 6 and Fig. 7 are detail views showing the various indicating plates which may be presented, Fig. 8 is a side elevation of the steering post with the controlling mechanism mounted thereon, part of the steering post being broken away, Fig. 9 is a front elevation of the same, and Fig. 10 is a side elevation of a modified form of a fender attachment to protect the signal boxes.

In the accompanying drawings wherein for the purpose of illustration is shown a preferred embodiment of my invention, the numeral 10 designates an automobile having suitably secured thereto brackets 11. These brackets encircle a shaft 12 which in turn has pivotally mounted thereon a pair of signal boxes 13 in which are suitably placed warning plates 14, 15 and 16. These plates, as shown to advantage in Figs. 4, 5 and 6, have on their respective faces the words—"Right" "Left" and "Stop," while a plain surface, as indicated by numeral 17, and shown to advantage in Fig. 7, is also provided to indicate the driver's intention.

Disposed on the shaft 12 is a threaded sleeve 18 which is provided with an adjusting screw 19. This sleeve permits various adjustments of the shaft in order that the signal boxes may be applied to different types of cars having various widths of body construction. As indicated here, the shaft 12 is made in two sections and has its respective ends, which are encircled by the sleeve, threaded to allow for various adjustments of the same. It is to be understood, however, that the shaft can be made in one piece without employing the two sections.

The numeral 20 designates bearings mounted on the shaft to prevent the contacting of the signal boxes 13 with the brackets 11.

Adjacent the rear brackets 11 and mounted on the rear of the machine, are auxiliary fenders 21, which support means for illuminating the signal at night time. These means can be suitably supplied from the lighting system of the vehicle. In Fig. 10 there is shown a modified form of the auxiliary fenders 21, and it will be noted that these forms of fenders not only cover the upper portion of the signal boxes 13, but also extend beneath the same in order to protect the signal boxes when the machine on which the signal is used has no rear mud guards.

Fixedly mounted on the shaft 12 is an element 22 provided with grooves 23 therein. This element can either be made integral with the shaft, or can be produced in the form of a separate element fixedly mounted on the shaft.

The numeral 23' indicates the steering post of the automobile, on which is disposed a cross bar 24. This cross bar terminates in clamping arms 25 which embrace the post and are secured by a screw 26. On the opposite ends of the cross bar there are mounted an indicating device 27 and a crank arm 28. This indicating device is provided with four faces on which the words "Right"—"Left"—"Stop"—and "Clear" are indicated in order that the driver may at once see the warning that the rear signal boxes set forth. Disposed adjacent the crank arm 28 and preferably made integral with the cross bar 25, a grooved wheel 29 is provided. This wheel is provided with a series of grooves corresponding in number to the grooves in the grooved element 23 mounted on the shaft 12.

For the purpose of imparting movement to the signal boxes, which are rigidly mounted on the shaft 12, a connecting member 30 is provided. This connecting member is preferably in the form of an endless cable and has a portion thereof looped about the grooved element 23 and the grooved wheel 29. In order to guide the connecting member 30 beneath the body of the car screw eyes 31 are provided.

It will be apparent that upon rotary movement of the crank arm 28 the connecting member 30 will impart movement to the shaft 12 and will regulate the positioning of the signal boxes 13 and will thus indicate the driver's intention.

It is to be understood that the form of my invention herewith shown and described, is to be taken as a preferred example of the same, and that various changes in the shape, size and arrangement of parts may be resorted to without departing from the spirit of the invention or the scope of the subjoined claim.

Having thus described my invention, I claim:—

A device of the character described including a shaft mounted on a vehicle, a sleeve member embracing and permitting various adjustments of said shaft, signal boxes provided with warning plates positioned on said shaft, a grooved element mounted on said shaft, mechanism mounted on the steering post of said vehicle and endless connecting means for conveying movement from said mechanism to said shaft to cause movement of said boxes into signaling position.

In testimony whereof I affix my signature.

CHARLES H. OSMAN.